No. 744,516. PATENTED NOV. 17, 1903.
E. EARLY.
RIDDLE FOR GRAIN CLEANERS.
APPLICATION FILED APR. 17, 1902.
NO MODEL.

Witnesses, Inventor,
Edward Early

No. 744,516. Patented November 17, 1903.

UNITED STATES PATENT OFFICE.

EDWARD EARLY, OF LATHROP, CALIFORNIA.

RIDDLE FOR GRAIN-CLEANERS.

SPECIFICATION forming part of Letters Patent No. 744,516, dated November 17, 1903.

Application filed April 17, 1902. Serial No. 103,292. (No model.)

*To all whom it may concern:*

Be it known that I, EDWARD EARLY, a citizen of the United States, residing at Lathrop, county of San Joaquin, State of California, have invented an Improvement in Riddles for Grain-Cleaners; and I hereby declare the following to be a full, clear, and exact description of the same.

My invention relates to a device which is intended for the separation of straw and chaff from grain.

My invention comprises details of construction which will be more fully explained by reference to the accompanying drawings, in which—

Figure 1:
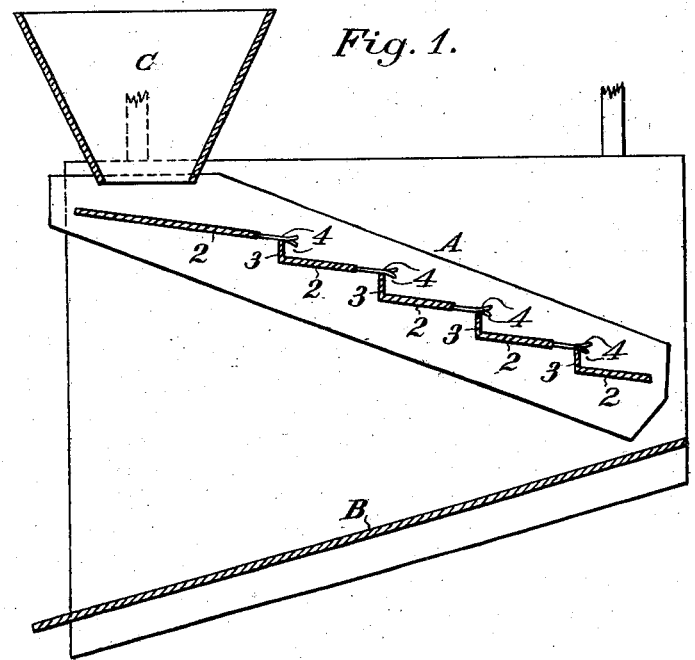
Figure 2:
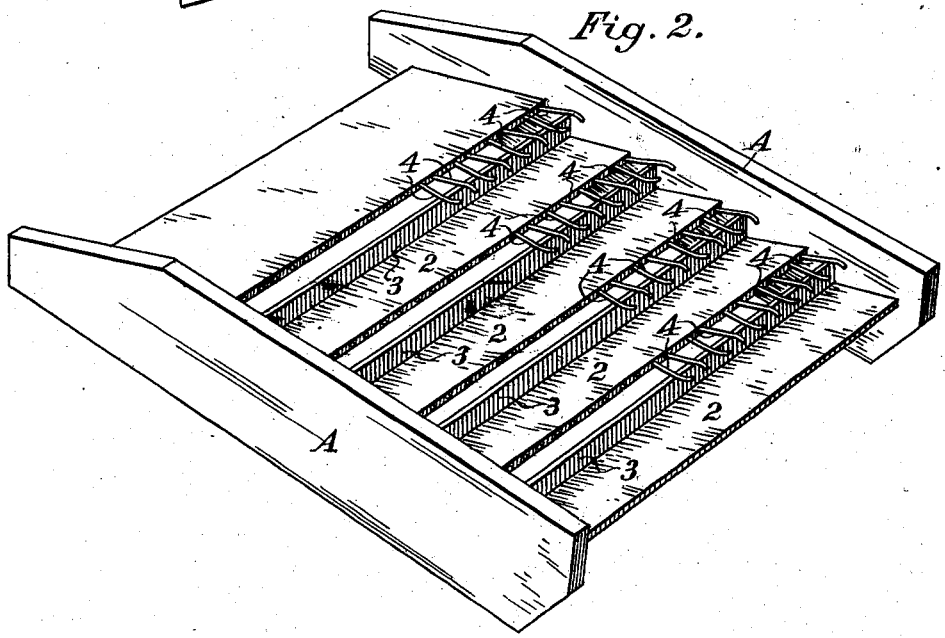

Figure 1 is a vertical section through the riddle. Fig. 2 is a perspective view.

In the construction of my improved riddle I have shown sides A and plates 2, extending transversely from one side to the other, having rear edges upturned, as shown at 3. These plates are set in the form of steps, each anterior plate being slightly below the level of the one behind and sufficiently in advance of it to leave an open space vertically between the anterior portion of one plate or surface and the posterior portion of the adjacent one. The riddle is so disposed that the plates incline downwardly from rear toward the front, as shown. Each of the plates has a series of pins 4 projecting from its anterior edge and extending over the next adjacent surface in front. These pins appear approximately parallel looking down upon them from above; but viewed from in front or sidewise the alternate pins are bent respectively upward and downward, which gives a staggered effect to the outer ends. This separates the pins at the outer ends, so that the spaces between them increase from the edge of the plate outwardly, the pins being smooth, and thus slightly divergent, and chaff and waste passing over them will not be entangled or clogged upon the pins, but will be discharged over the ends upon the next plate and set of pins below, and so on, passing from one to the other.

This riddle is properly suspended and is given a shaking motion by any well-known or desired contrivance for the purpose moving transversely. The grain, which has been already separated in a preliminary apparatus from the straw and heavier waste, is delivered through a suitable hopper or chute, as at C, upon the uppermost of the surfaces. Any suitable fan or other blast provides an air-current, which is discharged from the rear upwardly and forwardly through the spaces between the surfaces and between the pins.

The clean grain falling through this riddle is received upon a return-board or equivalent device, as B.

This riddle takes the place of several screens and is removably placed in any suitable shoe, which is suspended and connected with eccentrics or the like, by which shaking motion is transmitted.

Having thus described my invention, what I claim, and desire to secure by Letters Patent, is—

The combination in a grain-cleaning device of a riddle consisting of side frames, transverse plates or surfaces extending between said frames, each successive plate being located below and in advance of the front edge of the preceding one having upturned rear edges and inclining downwardly therefrom, wire pins projecting from the front edges over the intermediate spaces, and above the succeeding plates, said wires being alternately bent upward and downward so as to provide an increasing distance between them from the base to the discharge ends, and means for delivering material to be separated upon the uppermost of said plates.

In witness whereof I have hereunto set my hand.

EDWARD EARLY.

Witnesses:
S. H. NOURSE,
JESSIE C. BRODIE.